Oct. 8, 1940.  E. L. CRANDALL  2,217,104
TEMPORARY SEALING MEANS FOR GAS FILLED CABLES
Filed Jan. 18, 1939  2 Sheets-Sheet 1
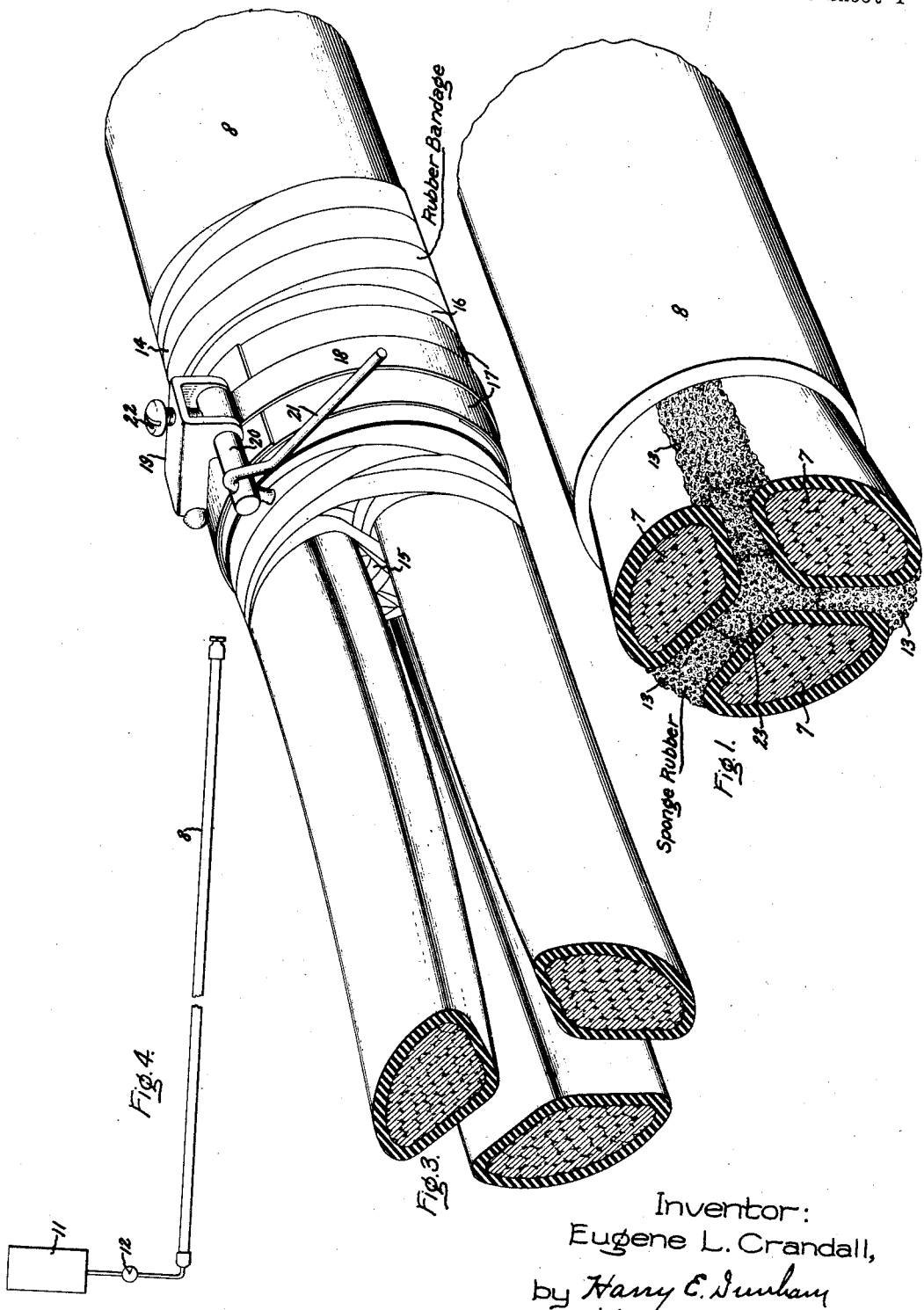
Inventor:
Eugene L. Crandall,
by Harry E. Dunham
His Attorney.

Oct. 8, 1940.  E. L. CRANDALL  2,217,104
TEMPORARY SEALING MEANS FOR GAS FILLED CABLES
Filed Jan. 18, 1939  2 Sheets-Sheet 2
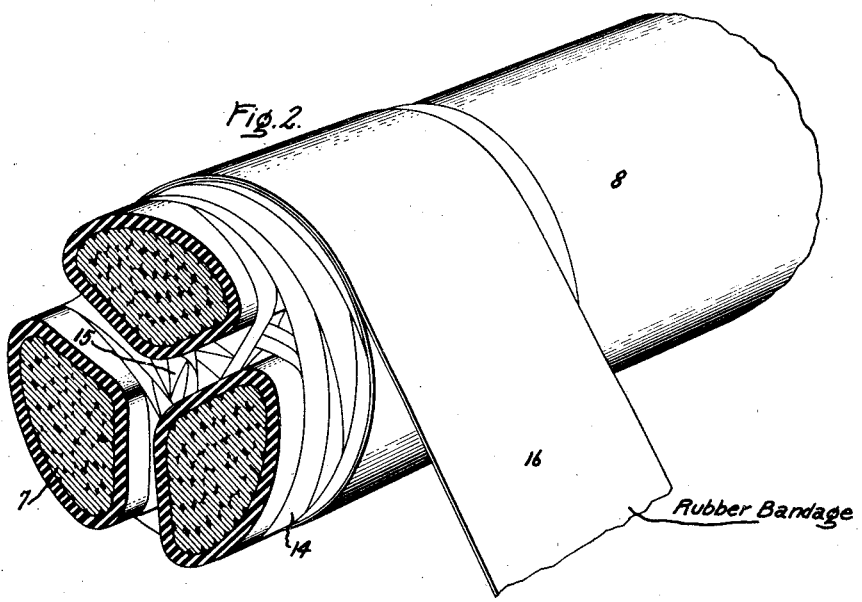
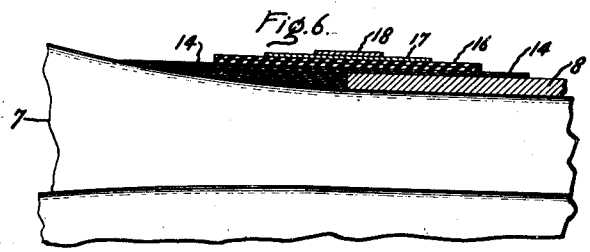
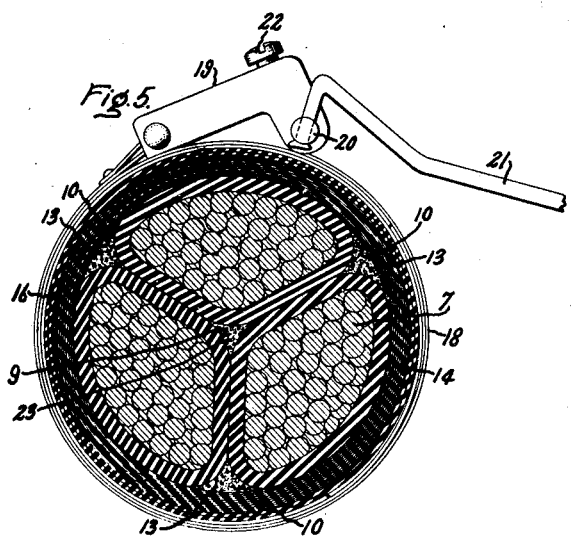
Inventor:
Eugene L. Crandall,
by Harry E. Dunham
His Attorney.

Patented Oct. 8, 1940

2,217,104

UNITED STATES PATENT OFFICE 2,217,104

TEMPORARY SEALING MEANS FOR GAS FILLED CABLES

Eugene L. Crandall, Scotia, N. Y., assignor to General Electric Company, a corporation of New York Application January 18, 1939, Serial No. 251,584

11 Claims. (Cl. 174—10)

The present invention relates to gas filled cables of the type which, briefly stated, comprise insulated conductors, an enclosing sheath, an impregnating compound for the insulation on the conductors, longitudinally extending free gas feed channels located within the sheath, and a filling of inert or neutral gas for the channels which is continuously maintained under a pressure that is above that of the atmosphere.

Cables of this character are shipped by the manufacturer on reels and later the reel lengths are united or jointed to form a cable of the desired length. Customarily, the reel lengths are drawn into conduits below the level of the street and the jointing operation carried out in manholes. During shipment and drawing, the cable is filled with gas, such as nitrogen for example, under positive pressure so that any leakage will be outward from the cable and not inward since any foreign matter sucked into the cable would be injurious. Any jointing operation requires opening a cable end and likewise the gas feed channels which, unless suitable precautions are taken, would permit rapid escape of the gas. In order to maintain a sufficient supply of gas at such times, the end of the cable remote from that being prepared for jointing is connected to a source of gas supply, such as a tank containing a relatively large supply of gas under substantial pressure, the supply being controlled by a suitable valve. Even when the supply of gas to the cable length is reduced by throttling, as for example, to two pounds per square inch, a large amount of gas would escape from the feed channels and thus be lost. Because of the conditions indicated above, it becomes necessary to temporarily seal the gas feed channels and in such manner as not to interfere with the subsequent steps in the jointing operation. While the sealing operation is being performed, there would of necessity be a continuous outward flow of gas from the cable until the seal is completed, and for that reason the sealing means should be of such character that it can be quickly applied and with the minimum effort. It is to be particularly noted that the gas feed channels, because of the structure of the cable, are not necessarily of exactly the same size and the walls thereof being unfinished are relatively rough.

My invention has for an object the provision of improved means for temporarily sealing the free feed channels of a cable filled with gas under positive pressure preparatory to jointing, the means being of such character that it can be quickly applied while gas is flowing from the channels and so constructed as not to interfere with the subsequent steps in the jointing operations.

A further object of my invention is an improved method of temporarily sealing the gas feed channels of a cable where the gas in the channels is maintained under a positive pressure.

For a consideration of what I believe to be novel and my invention, attention is directed to the accompanying description and the claims appended thereto.

In the drawings which are illustrative of my invention, Fig. 1 is a perspective view of one end of a gas filled cable showing sealing means for the ends of the gas channels; Fig. 2 is a perspective view showing the step of applying a bandage in a manner to complete the sealing; Fig. 3 is a perspective view showing a clamping means for holding the sealing means in place; Fig. 4 is a diagrammatic view of a gas filled cable with tank for supplying gas thereto; Fig. 5 is a cross-section of the cable showing the clamp in place, and Fig. 6 is a view in section of the sealing means.

Referring to Fig. 1, 7 indicates insulated conductors of segmental form so as to reduce as fully as possible the diameter of the cable but other shaped conductors may be employed. The conductors are each usually but not necessarily made up of a large number of strands according to common practice. The conductors are enclosed in an impermeable sheath 8 desirably made of lead. Where the conductors emerge from the sheath, they are splayed to a limited extent, the spacing between gradually increasing outwardly so as to afford the necessary space for the connectors employed to unite corresponding conductors. As best shown in Fig. 5, there is an inner free feed gas channel 9 located between the conductor coverings, and peripheral free feed gas channels 10 located between the conductor coverings and the inner wall of the sheath. These channels are filled with a gas under positive pressure at all times which includes the period of shipment of the cable from the factory and its installation in underground ducts.

When the sheath 8 is cut preparatory to the jointing operation, gas immediately starts to flow from the cable into the atmosphere where it is lost. Each cable length is provided at the point of installation with a gas containing tank such as 11, Fig. 4, under positive pressure, and a valve 12 by which the pressure of the gas entering the free feed channels of the cable may be controlled. During jointing, the pressure is reduced to a low value of the order of a few pounds to prevent excessive loss of gas. Even with the gas pressure reduced, it is evident that a considerable quantity of gas can escape through the open ends of the free feed gas channels. This makes it imperative that a suitable sealing means for the channels be provided, and particularly one that can be quickly applied and removed.

To attain this result, the outer end of center channel is plugged with a soft compressible material which is unaffected by the gas in the channel. The material should be soft since the walls of the channel may not be very smooth. For this purpose, a plug 23 made of soft sponge rubber or equivalent material is tightly forced into the open end of the channel by a suitable tool to form a seal, a portion of the plug being located within the sheath and a portion outside thereof between the conductor coverings. The peripheral free feed gas channels 10 are similarly plugged as indicated by the plugs 13, Fig. 1, which are likewise made of soft sponge rubber or equivalent material. These are also forced into the open ends of the channels by a suitable tool, with the result that the inner end of each plug is compressed to form a seal. On account of the fact that there is always gas pressure within the sheath tending to drive out the plugs, and because of their elasticity, the plugs tend to bulge, especially the outer ones, it becomes necessary to firmly hold them in place and also prevent gas from escaping over the curved or peripheral portions of the insulation on the conductors. In this connection, it is to be noted that the ends of the feed channels are of a generally triangular shape having relatively sharp ends. On account of the peculiar shapes of the channels and of the insulated conductors, it becomes necessary to do other things than merely plug the ends of the channels. The plugs when properly installed close the ends of the channels and prevent the escape of gas therethrough. However, it is necessary on account of the irregular shape of the parts to provide additional sealing means. Also as has been indicated, it is necessary to secure the plugs in their respective positions. This is done by first winding enough fabric tape 14 around the end of the sheath to afford good anchorage and then winding it around the bulging peripheral plugs 13 which has the effect of compressing them into firm contact with the conductor coverings and also the center plug as well as to firmly anchor them in place. The diameter of the sheath being somewhat greater than that of the assembled conductors, a sufficient amount of tape is wound over the conductor coverings and plugs to make the two of substantially the same diameter. This has the additional effect of making a seal around the cut end of the sheath where the conductor emerges. The same or a separate length of tape is also wound over the conductor coverings and diagonally across the end of the center plug to hold it under compression, and retain it against the gas pressure. This is best shown in Fig. 2 where the crossover or lacing parts of the tape or tapes are indicated at 15. The tape is desirably impregnated so as to make it highly resistant to the escape of gas.

The wrapping of the tape 14 over the conductor coverings to the approximate outside diameter of the sheath with a portion overlying the sheath end greatly reduces the opportunity for leakage, and may even prevent it. However, to make sure that gas cannot escape, a further step is taken, namely, winding a rubber strip or bandage 16 desirably in layer form under considerable tension over the tape on the sheath and over that on the conductor coverings and the peripheral plugs. The bandage is so arranged that it partly covers the sheath end and also the parts adjacent thereto. In order to hold the bandage in place and also exert inward pressure on it and the parts directly under, a flexible clamping means is provided. As an illustration, I have shown a split metal band 17 and a metal strap 18, one end of which is pivotally connected to a fitting 19 and the other end is secured to a spindle 20 carried by downwardly extending ears on the fitting. The spindle has a handle 21 for rotating it and in so doing coil up the end of the strap attached thereto. After the strap has been tightly applied over the band, it is held in that position by a set screw 22.

As indicated above, the sealing means are intended for temporary application while the extended end of the conductors as shown in Fig. 3 are united with corresponding conductors of another length of cable. The treatment of both lengths is the same and hence need not be further described. The actual uniting of the conductor ends will be performed in the usual way. After the ends are properly united and before the joint casing is applied, it is necessary to remove the sealing parts. This is done by first removing the clamp, then the rubber bandage, then the tape, after which the sponge rubber plugs are unseated and removed. When both cable ends are so treated, the joint casing is slipped into place and soldered or otherwise secured to the cable sheaths. During the period that the seals are being removed, there will be an escape of gas but because of the character of the seals and the ease with which they may be removed, the loss is not great as has been amply demonstrated in practice on actual installations of such gas filled cable.

What I claim as new and desire to secure by Letters Patent of the United States is:

1. A cable of the character having a plurality of spirally arranged relatively rigid insulated conductors, an enclosing sheath therefor through which the conductors project, the conductor ends beyond the sheath being splayed, a first channel having an open end and defined by the coverings on the conductors and containing fluid under positive pressure, a second channel having an open end and defined by the inner wall of the sheath and the coverings on the several conductors also containing fluid under positive pressure, a first elastic plug for closing the open end of the first channel, a second elastic plug for closing the open end of the second channel, a tape extending across and contacting with the outer end of the first plug for holding it in place, and a second tape wrapped around the conductors and the second plug for holding it in place.

2. A cable comprising a sheath, a plurality of relatively rigid insulated segmental conductors therein assembled to define central and peripheral open ended channels, the exposed ends of the conductors being splayed, a filling of gas under positive pressure for the channels, an elastic means pressure fitted into the open end of the central channel for closing it, radially disposed elastic means pressure fitted between the conductor coverings and situated partly within and partly outside of the sheath for closing the open ends of the peripheral channels, a bandage for compressing the several radially disposed means inwardly, and a clamping means for exerting inward pressure on the bandage.

3. A cable comprising a sheath, a plurality of relatively rigid insulated segmental conductors therein assembled to define central and also peripheral open ended channels, the exposed ends of the conductors being splayed, a filling of gas under positive pressure for the channels, an elastic plug making a forced endwise fit in the open end of the central channel, a plurality of radially positioned outer elastic plugs located between the conductor coverings and the sheath, each entering a peripheral channel, the inner surfaces of the outer plugs engaging the center plug, a binding means for exerting inward radial pressure on the outer plugs and through them on the inner plug, and a clamp for holding the means in place and exerting pressure on the plugs.

4. A cable comprising a sheath, a plurality of insulated relatively rigid conductors therein assembled to define central and peripheral open ended channels, the ends of the conductors extending beyond the sheath, a filling of fluid under positive pressure for the channels, a closing means for the central channel, elastic plugs located between conductors for closing the peripheral channels, a portion of each plug being covered by the sheath and the remainder exposed, a tape crossing the outer end of the central closing means to prevent endwise displacement thereof, and means overlapping the end of the sheath and the outer plugs for holding the latter in their respective positions against the pressure of the fluid within the sheath.

5. A cable comprising a sheath, a plurality of relatively rigid segmental insulated conductors therein assembled to define central and peripheral open ended channels, the ends of the conductors being extended beyond the sheath and splayed, a filling of fluid under positive pressure for the channels, a closure for the central channel located between the splayed ends of the conductors, individual compressible plugs for closing the outer channels located between the conductor coverings and the sheath, a portion of each plug extending beyond the end of the sheath, a tape wound over an end of the sheath, the conductors, the exposed portions of the plugs and the central closure for holding them in place under compression, an elastic bandage under tension which covers an end of the sheath and parts of the outer plugs and exerts inward compression pressure on the plugs, and a detachable clamp enclosing the bandage and holding it in place.

6. A cable comprising insulated relatively rigid segmental conductors, an enclosing sheath from the end of which the conductors divergingly project, longitudinally extending free open ended channels located within the sheath containing gas under positive pressure, a separate elastic means for sealing the open end of each of the channels, a part of which is compressed between two adjacent conductor coverings, a tape wound around the exposed parts of conductors adjacent the end of the sheath and also over the elastic means to prevent leakage of gas from between the inner wall of the sheath and the conductor coverings, and a tight fitting bandage, a part of which overlies the sheath and the remainder of which overlies the tape and forms an additional gas seal.

7. A cable comprising insulated relatively rigid segmental conductors, an enclosing sheath from the end of which the conductors divergingly project, longitudinally extending free open ended channels located within the sheath containing gas under positive pressure, a separate removable means for sealing the open end of each of the channels, a part of which is located between the diverging conductors and also compressed, a tape wound around the end of the sheath and the exposed parts of the conductors and elastic means adjacent the sheath end to form a seal and also around certain of the means to hold them in compression and across the outer end of one of the means in engagement therewith to hold it in place, an elastic bandage tightly surrounding a part of the sheath end and also the tape immediately adjacent thereto, and a means applied over the bandage to hold it in a compressed state.

8. The method of sealing the cut end of a cable having insulated conductors, a sheath and free feed central and peripheral open ended channels containing gas under positive pressure, which comprises forcing elastic material into the open ends of the channels under the sheath, leaving a portion exposed, winding tape over the exposed portions of elastic material in the peripheral channels to compress it, and winding tape crosswise over the outer end of the material in the center channel to hold it in position.

9. A cable having an impervious sheath, an insulated conductor located therein and projecting beyond an open end of the sheath, a feed channel located within the sheath and between it and the insulation, containing fluid under positive pressure and having an open end, a packing of soft porous elastic material situated partly within the open end of the channel and partly outside of it, the packing within the sheath making a forced fit with the inner wall thereof and with the insulation, and a body of tape having one portion thereof wrapped over the sheath to afford anchorage therefor and also over the end edge of the sheath and a second portion wrapped over the packing located outside of the channel and sheath for firmly holding it in a compressed state against the insulation on the conductor.

10. A cable of the character described having a sheath, a plurality of spirally arranged relatively rigid insulated conductors within the sheath, the ends of the conductors being splayed beyond the confines of the sheath, inner and outer open ended channels within the sheath filled with fluid under positive pressure, an elastic plug pressure fitted into the open end of the inner channel for closing it, other individual elastic plugs pressure fitted between the conductor coverings and the sheath for closing the open ends of the outer channels, a part of each plug being within a channel and the remainder outside thereof and of the sheath, means extending across the outer end of and engaging the first mentioned plug to hold it in place, and a binding band for exerting inward and radial pressure on the second mentioned plugs for compressing them between conductor coverings outside the sheath and also to hold them in place against the fluid pressure in the channels.

11. A cable comprising a plurality of relatively rigid insulated conductors of segmental form, an enclosing sheath from the end of which the conductors project, the conductors diverging beyond the sheath end, longitudinally extending free open ended channels located within the sheath and defined by the inner wall of the sheath and the conductor coverings, the channels containing gas under positive pressure, individual elastic means filling the open ends of the channels, the means having extensions located between the diverging ends of the conductors and wedged between the coverings thereof, and a body of tape wound around the diverging parts of the conductors adjacent the end of the sheath to prevent leakage of gas from between the inner walls of the sheath and the conductor coverings and also to hold the elastic means in a compressed state, said body tapering from the end of the sheath toward the conductor ends.

EUGENE L. CRANDALL.